(12) United States Patent
Sakai et al.

(10) Patent No.: US 11,525,994 B2
(45) Date of Patent: Dec. 13, 2022

(54) ADAPTER, MICROSCOPE ADJUSTMENT METHOD, MICROSCOPE SYSTEM, AND STORAGE MEDIUM

(71) Applicant: CANON KABUSHIKI KAISHA, Tokyo (JP)

(72) Inventors: Akihiro Sakai, Yokohama (JP); Osamu Nagatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 526 days.

(21) Appl. No.: 16/146,624

(22) Filed: Sep. 28, 2018

(65) Prior Publication Data

US 2019/0033570 A1 Jan. 31, 2019

Related U.S. Application Data

(63) Continuation of application No. PCT/JP2017/012912, filed on Mar. 29, 2017.

(30) Foreign Application Priority Data

Mar. 31, 2016 (JP) .............................. JP2016-072598

(51) Int. Cl.
*G02B 21/00* (2006.01)
*G02B 21/36* (2006.01)
(Continued)

(52) U.S. Cl.
CPC .......... *G02B 21/362* (2013.01); *G02B 21/00* (2013.01); *G02B 21/36* (2013.01); *G02B 21/248* (2013.01); *G02B 21/26* (2013.01); *G02B 21/34* (2013.01)

(58) Field of Classification Search
CPC ........ G02B 21/00; G02B 21/24; G02B 21/36; G02B 21/362
(Continued)

(56) References Cited

U.S. PATENT DOCUMENTS 6,147,797 A * 11/2000 Lee ...................... G02B 21/365
348/79
2002/0012045 A1* 1/2002 Nomura ............... G02B 21/362
348/75
(Continued)

FOREIGN PATENT DOCUMENTS

JP 4-301547 A 10/1992
JP H08-011068 A 1/1996
(Continued)

*Primary Examiner* — Thong Q Nguyen
(74) *Attorney, Agent, or Firm* — Canon U.S.A., Inc. IP Division

(57) ABSTRACT

An adapter which controls rotation of a microscope on which a slide is placed and an imaging unit and which easily performs correction of a rotation shift is provided. The adapter includes a first connection member connected to a microscope, a second connection member connected to an imaging unit, a rotation member arranged between the first and second connection members and configured to rotate the second connection member relative to the first connection member using optical axes of the microscope and the imaging unit at a center, a control member configured to be fixed on one of the first and second connection members and control the rotation of the connection member, and a driving member configured to be engaged with the first connection member or the second connection member and change a position of the second connection member relative to the first connection member around the optical axes.

12 Claims, 9 Drawing Sheets

(51) Int. Cl.
   *G02B 21/24* (2006.01)
   *G02B 21/26* (2006.01)
   *G02B 21/34* (2006.01)

(58) Field of Classification Search
   USPC ..... 359/808, 811, 368–390, 384; 348/75–79; 396/428–433, 544
   See application file for complete search history.

(56) References Cited

U.S. PATENT DOCUMENTS

2015/0054935 A1* 2/2015 Muramatsu ............ G02B 21/24
   348/79
2017/0329118 A1* 11/2017 Sakamoto ............ G02B 21/367

FOREIGN PATENT DOCUMENTS

| | | |
|---|---|---|
| JP | 2006-349762 A | 12/2006 |
| JP | 2012-208523 A | 10/2012 |
| JP | 2015-099195 A | 5/2015 |
| JP | 2015-127775 A | 7/2015 |
| JP | 2015-127777 A | 7/2015 |
| JP | 2015-127780 A | 7/2015 |

* cited by examiner

MOVING DIRECTION

MOVING DIRECTION

ADAPTER, MICROSCOPE ADJUSTMENT METHOD, MICROSCOPE SYSTEM, AND STORAGE MEDIUM

CROSS-REFERENCE TO RELATED APPLICATIONS

This application is a Continuation of International Patent Application No. PCT/JP2017/012912 filed Mar. 29, 2017, which claims the benefit of Japanese Patent Application No. 2016-072598, filed Mar. 31, 2016, all of which are hereby incorporated by reference herein in their entirety.

TECHNICAL FIELD

The present invention relates to an adapter, a microscope adjustment method, a microscope system, and a storage medium.

BACKGROUND ART

In a pathological diagnosis using a microscope system, a situation in which a position on a slide is stored and observation is performed again in the stored position may occur. PTL 1 discloses rotation of an observation optical system in accordance with rotation of a stage on which an observation target is placed.

CITATION LIST

Patent Literature

PTL 1 Japanese Patent Laid-Open No. 4-301547

A rotational shift between a position of a slide and a position stored for observation may be generated. In this case, as disclosed in the technique in PTL 1, if the stage and the observation optical system are rotated in cooperation with each other, it may be difficult to correct the rotational shift.

SUMMARY OF INVENTION

According to an embodiment of the present invention, An adapter includes a first connection member configured to be connected to a microscope, a second connection member configured to be connected to an imaging unit, a rotation member arranged between the first connection member and the second connection member and configured to rotate the second connection member relative to the first connection member using optical axes of the microscope and the imaging unit at a center, a control member configured to be fixed on one of the first and second connection members and control the rotation of the connection member, and a driving member configured to be engaged with the first connection member or the second connection member and change a position of the second connection member relative to the first connection member around the optical axes.

Further features of the present invention will become apparent from the following description of exemplary embodiments with reference to the attached drawings.

DESCRIPTION OF EMBODIMENTS

First Embodiment

Figure 1:
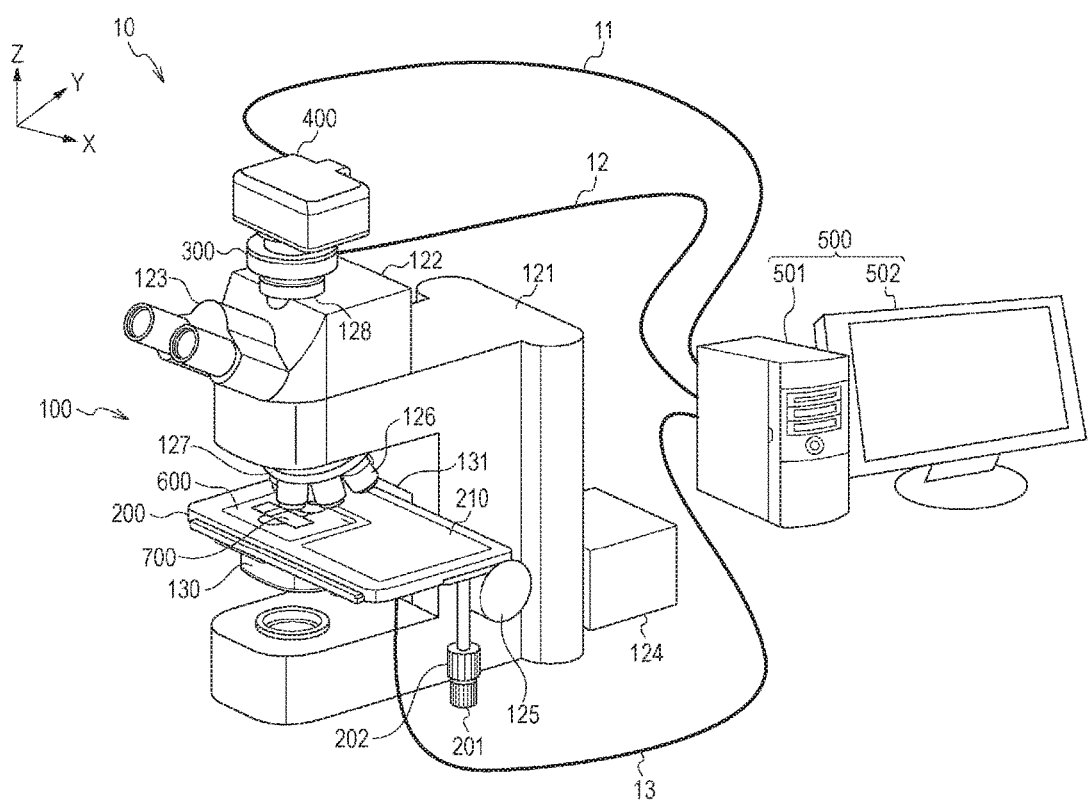
FIG. 1 is a diagram illustrating an example of a microscope system according to a first embodiment.

A treatment policy for a cancer is determined based on a pathological diagnosis for determining properties of the cancer. When a gene is mutated, the mutation appears as an atypia of morphology of an inside of a cell, an atypia of cell morphology, or the like, and causes a cancer. Such morphology of an atypia is observed by a microscope so that a histological type is determined in a morphological diagnosis in the pathological diagnosis.

On the other hand, the fact that a specific type of protein is likely to excessively appear in cancer cells is revealed in recent years. A characteristic of a cancer may be determined by detecting the protein which has excessively appeared. For example, target protein is specifically stained. Thereafter, staining intensity for each cell is observed by a microscope so that the target protein which has excessively appeared may be detected. This method is for determining functional characteristics of cancers, and therefore, is referred to as a "functional diagnosis" in the pathological diagnosis.

In both of the morphological diagnosis and the functional diagnosis, a fine structure of a tissue section is observed in detail using a microscope (hereinafter referred to as a "micro diagnosis"). Optical microscopes are an important tool for pathologists who are doctors making a pathological diagnosis. Furthermore, content observed in the micro diagnosis may be recorded as an image. Therefore, a digital still camera may be attached to an optical microscope so that an image obtained by the micro diagnosis is recorded. Accordingly, digital still cameras which are provided with an imaging function are also an important tool for pathologists, in addition to microscopes.

In general, pathologists make a morphological diagnosis on a tissue section in the following procedure in the pathological diagnosis. In screening performed at the beginning of the morphological diagnosis, a pathologist places a tissue section which has been subjected to hematoxylin-eosin (HE) staining on a slide glass (hereinafter referred to as a "slide") and observes the tissue section by a microscope in a low magnification. A region which is suspected to be a lesioned portion is specified as a region of interest (ROI) and the ROI is observed in a high magnification so that detailed observation is performed. In this case, the pathologist alternately performs the observation in the low magnification and the high magnification while an observation visual field is shifted, that is, a stage of the microscope on which the slide is placed is shifted.

For example, the pathologist performs screening on an entire subject placed on the slide in a low magnification and records a position of the stage where an ROI which is a suspect lesioned portion is observed. After the screening in the low magnification is terminated, the ROI is searched for in accordance with the recorded position of the stage, and thereafter, detailed observation is performed in a high magnification. In the functional diagnosis, functional staining, such as immunohistochemical staining, is performed on a serial section of tissue sections which are determined to have a specific finding in the morphological diagnosis before observation is performed using a microscope.

In the morphological diagnosis, an operation of positioning morphological images of a plurality of slides fabricated by a plurality of sections which are adjacent to each other with high accuracy, displaying the images in a superposed manner, and observing a change of a tissue in a thickness direction is efficient in terms of the diagnosis. Furthermore, an operation of positioning a morphological image of the HE staining and a plurality of functional images of functional staining with high accuracy in an overlapping manner and comparing an atypia of morphology with a change of a function for observation is efficient in terms of diagnosis.

However, in general microscope systems, an observation position and a position of capturing of a still image may not be reproduced with accuracy for the pathological diagnosis. For example, if a rotation shift is generated between an imaging unit, such as a digital still camera, and a microscope, positions may not be managed with accuracy appropriate for the pathological diagnosis.

An adapter 300 according to a first embodiment is provided to realize accurate positioning between a microscope and an imaging unit. Furthermore, a microscope camera adapter which has high operability since attachment directions of an imaging unit and a microscope are not restricted and which is capable of performing rotation positioning with high accuracy is provided.

The adapter 300 according to the first embodiment includes a camera mount 301 connected to a digital still camera and a microscope mount 304 connected to a microscope. Furthermore, the adapter 300 has a positioning reference member 302 of a C ring shape which may be switched between a fixed state and an unfixed state relative to the camera mount 301, which is supported in a movable manner in a circumferential direction, and which serves as a control member.

A micrometer head 306 which finely corrects a rotation position of a digital still camera 400 is disposed on the microscope mount 304. The microscope mount 304 brings the positioning reference member 302 and the micrometer head 306 into contact with each other and corrects the detailed positional relationship of the digital still camera relative to the microscope. Furthermore, the adapter 300 may cause the positioning reference member 302 to move to various positions relative to the camera mount 301, and therefore, allows the digital still camera 400 to be attached in a desired direction. Hereinafter, a description will be made in detail.

FIG. 1 is a diagram illustrating an example of a configuration of a microscope system 10 according to the first embodiment. The microscope system 10 includes a microscope 100, a stage 200, the adapter 300, the digital still camera 400, and a control unit 500. A controller 501 and a display 502 are connected to the control unit 500. The controller 501 performs display control on the display 502.

A lens base 121 included in the microscope 100 is a rigid frame to which various components of the microscope are attached. An ocular lens base 122 is fixed on the lens base 121 and is connected to an ocular lens barrel 123. A light source box 124 accommodates a light source for transmissive observation and is attached to the lens base 121. Examples of the light source include a halogen lamp and a light-emitting diode (LED). A Z-knob 125 is used to move a Z-base 130 in a Z direction. The stage 200 having a position management function is mounted on the Z-base 130. The Z-base 130 is attached to the lens base 121 through a Z-base movement mechanism 131 which moves the Z-base 130 in the Z direction in accordance with rotation of the Z-knob 125. An objective lens unit 126 has a lens corresponding to an optical magnification. A revolver 127 has a configuration in which a plurality of objective lens units 126 are attached. The user rotates the revolver 127 so as to select one of the objective lens units 126 to be used for observation.

A slide having a positional reference (hereinafter referred to as a slide 700) is placed on the stage 200. The stage 200 includes ΔΘ-stage 600 which rotates arounds a Z axis. The stage 200 moves the ΔΘ-stage 600 on an XY plane. The ΔΘ-stage 600 has a function of correcting a rotation shift between the slide 700 and the stage 200 based on a position reference mark on the slide 700. The stage 200 further includes an XY scale plate 210 which is a high-accuracy scale in an XY direction. An X-knob 201 and a Y-knob 202 are used to manually move the stage 200 in an X direction and a Y direction, respectively. The stage 200 is connected to the controller 501 through an interface cable 13, such as a USB cable.

The adapter 300 is connected to the ocular lens base 122 through a lens base mount 128. The microscope mount 304 includes the lens base mount 128. The microscope mount 304 is an example of a first connection member for connection with the microscope 100. Furthermore, the adapter 300 is connected to the digital still camera 400 through the camera mount 301. The camera mount 301 is an example of a second connection member for connection with the digital still camera 400 which is an example of the imaging unit. The ocular lens base 122 and the digital still camera 400 are connected to each other through the adapter 300. The adapter 300 has a function of matching optical axes of the digital still camera 400 and the lens base mount 128. The adapter 300 is connected to the controller 501 through an interface cable 12, such as a USB cable.

The digital still camera 400 is detachably attached to the microscope 100 through the adapter 300 while the predetermined positional relationship between the digital still camera 400 and the ocular lens base 122 is maintained. The digital still camera 400 captures an observation image obtained by the microscope 100. The digital still camera 400 is an example of the imaging unit. The digital still camera 400 is connected to the controller 501 through a USB interface cable 11. The digital still camera 400 captures an observation image obtained by the microscope under control of the controller 501. The captured observation image is displayed in the display 502 under control of the controller 501. The digital still camera 400 has a live-view function of performing so-called live-view by displaying output of an image sensor 401 in the display 502 in real time. The digital still camera 400 further has a still-image function of capturing still images. Images obtained by the live-view function may have lower resolution than images obtained by the still-image function.

Figure 2A:
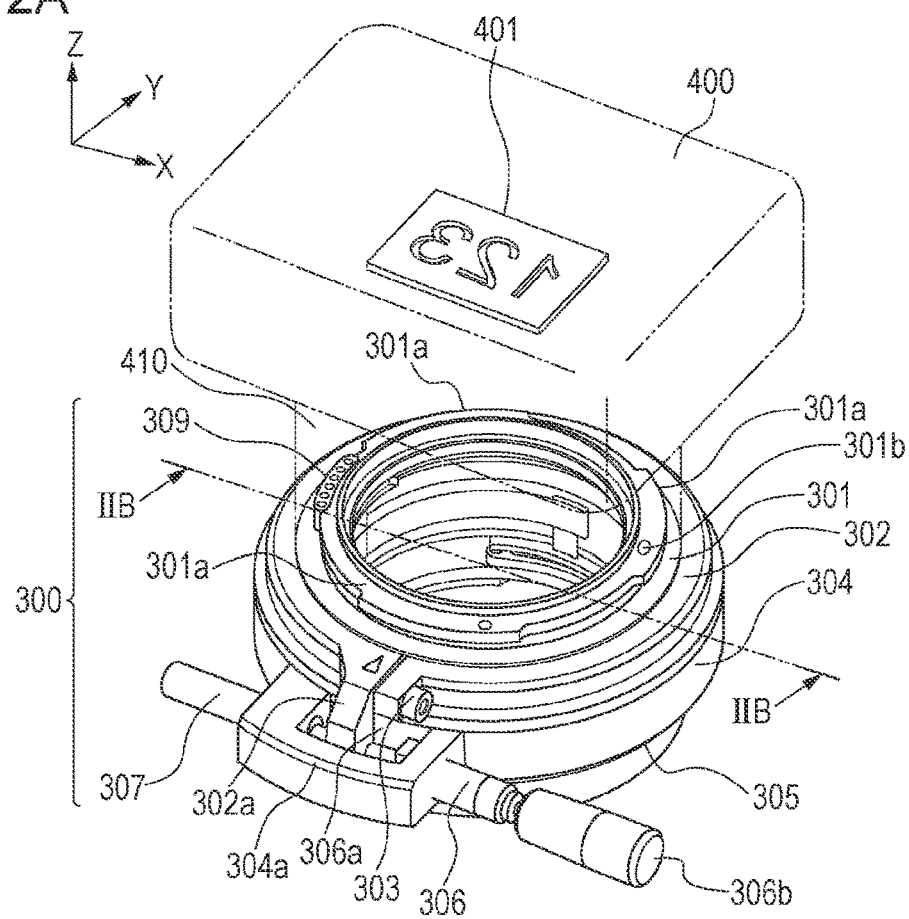
FIGS. 2A and 2B are diagrams illustrating an example of an adapter according to the first embodiment.
Figure 2B:
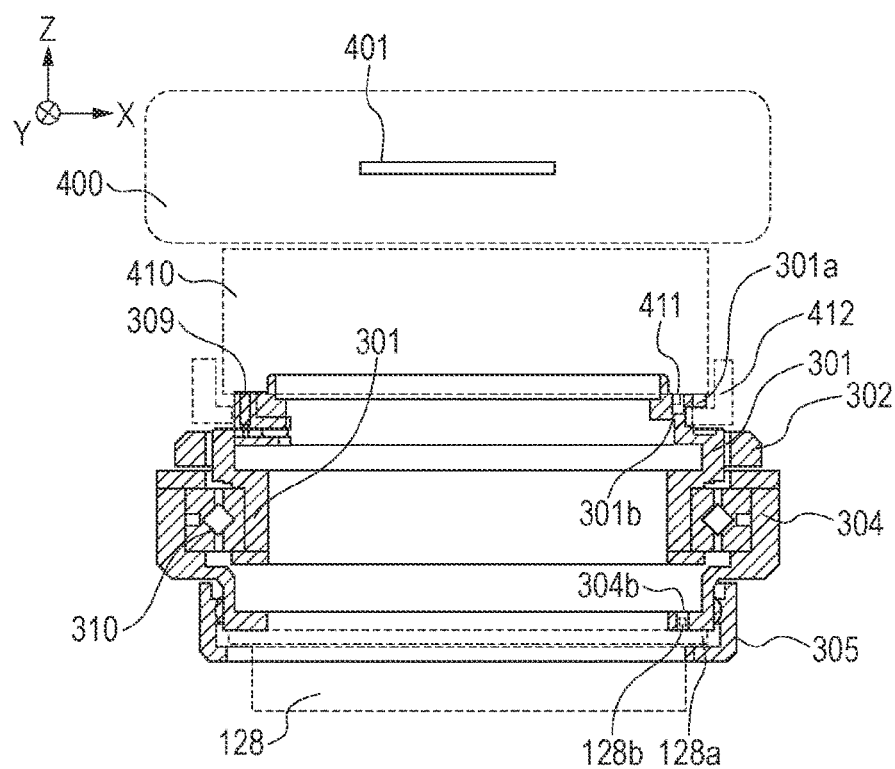

FIG. 2A is a perspective view of the adapter 300 according to the first embodiment. FIG. 2B is a cross-sectional view taken along a line IIB to IIB of FIG. 2A. The camera mount 301 is connected to the digital still camera 400 including the image sensor 401 through a digital still camera extension tube 410. The microscope mount 304 is connected to the microscope 100 through the lens base mount 128. The microscope mount 304 has a male screw groove portion formed in an outer circumference thereof. Furthermore, a microscope mount ring 305 has a female screw groove portion formed in an inner circumference thereof. The microscope mount 304 has such a screw mechanism. The microscope mount 304 and the lens base mount 128 are connected to each other by the screw mechanism through a lens base mount flange portion 128a which is partially protruded and the microscope mount ring 305. A lens base mount positioning pin 128b is stopped in a position in a predetermined rotation direction in a state in which the lens base mount positioning pin 128b is engaged with a microscope mount positioning hole 304b and optical axes thereof match each other.

A tip end outer circumference portion of the camera mount 301 has three camera mount flanges 301a which partially protrude. The digital still camera extension tube 410 and the camera mount 301 are connected to the camera mount flanges 301a and a digital still camera extension tube ring 412. Furthermore, the lens base mount flange portion 128a which partially protrudes is connected to the microscope mount ring 305 by a screw mechanism. In this case, a digital still camera positioning pin 411 stops in a position in a predetermined rotation direction in a state in which the digital still camera positioning pin 411 is engaged with a camera mount positioning hole 301b and optical axes thereof match each other. As described above, the adapter 300 connects the digital still camera 400 and the microscope 100 to each other.

The camera mount 301 is supported by the microscope mount 304 in a rotation available manner through a bearing 310. The camera mount 301 is fixed in an internal ring of the bearing 310, and the microscope mount 304 is fixed in an outer ring of the bearing 310. A position of the camera mount 301 relative to the microscope mount 304 may be changed by the bearing 310. Then, the camera mount 301 smoothly rotates relative to the microscope mount 304 through the bearing 310 with an optical axis at a center. The bearing 310 is an example of a rotation member.

The positioning reference member 302 is formed of metallic having a C-type ring shape. The positioning reference member 302 is fixed on the microscope mount 304. An inside diameter of the positioning reference member 302 is slightly larger than an outside diameter of the camera mount 301 by approximately 1 µm to 2 µm, for example. A first end portion 302a of the positioning reference member 302 (FIGS. 3A and 3B) has a female screw hole. A second end portion 302b of the positioning reference member 302 has a through hole formed therein, and a slit of approximately several mm is formed between the first end portion 302a and the second end portion 302b. A bolt 303 is screwed into the female screw portion of the first end portion 302a via the through hole, and a gap between the first end portion 302a and the second end portion 302b may be reduced by fastening power of the bolt 303. When the bolt 303 is fastened, a frictional force is generated on a circumference surface in which the positioning reference member 302 and the camera mount 301 are in contact with each other so that the positioning reference member 302 is fixed on the camera mount 301. In this way, the positioning reference member 302 is fixed on the camera mount 301. By this, rotation of the digital still camera 400 relative to the microscope 100 is fixed. When the bolt 303 is released, the frictional force on the circumference surface in which the positioning reference member 302 and the camera mount 301 are in contact with each other is reduced. The positioning reference member 302 is movable in a circumferential direction relative to the camera mount 301, that is, the positioning reference member 302 enters an unfixed state. Accordingly, the rotation of the digital still camera 400 relative to the microscope 100 becomes unfixed. The positioning reference member 302 is an example of a control member. The control member has a fixed state and an unfixed state relative to the first connection member or the second connection member and determines whether one of the connection members is integrally moved or independently moved.

The micrometer head 306 is supported by a structure 304a of the microscope mount 304. The micrometer head 306 has a precise screw mechanism in an inside thereof and may convert a rotation angle of a screw into rectilinear displacement. The micrometer head 306 may be moved in accordance with rotation of a handle portion 306b mm so that a tip end portion 306a is moved in the X direction by a movement amount corresponding to a stroke distance of ±5. A movement amount of the tip end portion 306a corresponding to a single rotation of the handle portion 306b is equal to or smaller than 1 µm, and the micrometer head 306 may finely control the movement. The tip end portion 306a is in contact with the first end portion 302a of the positioning reference member 302. In this way, the micrometer head 306 may rotate the camera mount 301 relative to the microscope mount 304 with high accuracy. The micrometer head 306 is an example of a driving member. Specifically, the micrometer head 306 is an example of a driving member which is engaged with the first connection member or the second connection member and which changes a position of the second connection member relative to the first connection member around the optical axis.

In the first embodiment, the first end portion 302a serves as a unit which fixes the positioning reference member 302 to the camera mount 301 and a unit for fine adjustment performed by the micrometer head 306. The adapter 300 according to the first embodiment may perform rough adjustment and fine adjustment by a simple configuration. Specifically, a first variable range for a position of the second connection member relative to the first connection member in an unfixed state of the control member is larger than a second variable range in a fixed state of the control member.

Furthermore, a spring plunger 307 which is supported by the structure 304a of the microscope mount 304 is in contact with the first end portion 302a. The spring plunger 307 faces the micrometer head 306 and is in contact with another surface of the first end portion 302a. The spring plunger 307 has a compression spring in an inside thereof and presses the compression spring with force weaker than force applied to the tip end portion 306a in a direction which is antagonistic to the tip end portion 306a in an X axis. By this, backlash of the tip end portion 306a and the positioning reference member 302 is suppressed.

Note that the manual driving method of the micrometer head 306 serving as a fine feeding mechanism which is an example of a driving member has been described as an example in the first embodiment. The fine feeding mechanism may employ a gear mechanism method, such as worm and wheel, or an electric drive method using a direct-current (DC) motor or an ultrasonic motor.

Figure 3A:
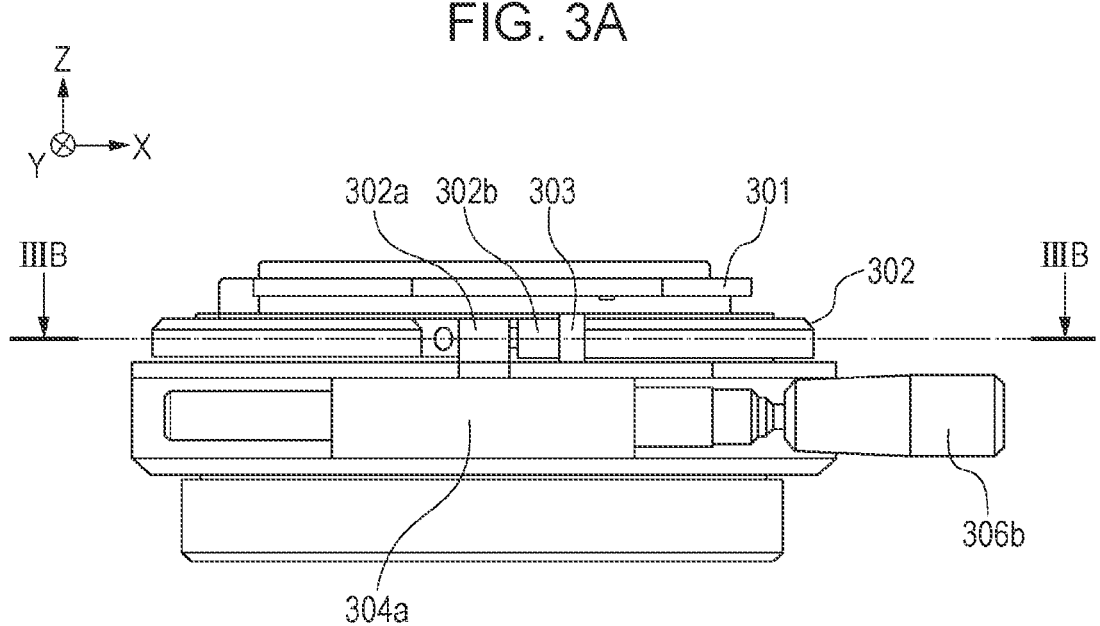
FIGS. 3A and 3B are diagrams illustrating an example of the adapter according to the first embodiment.
Figure 3B:
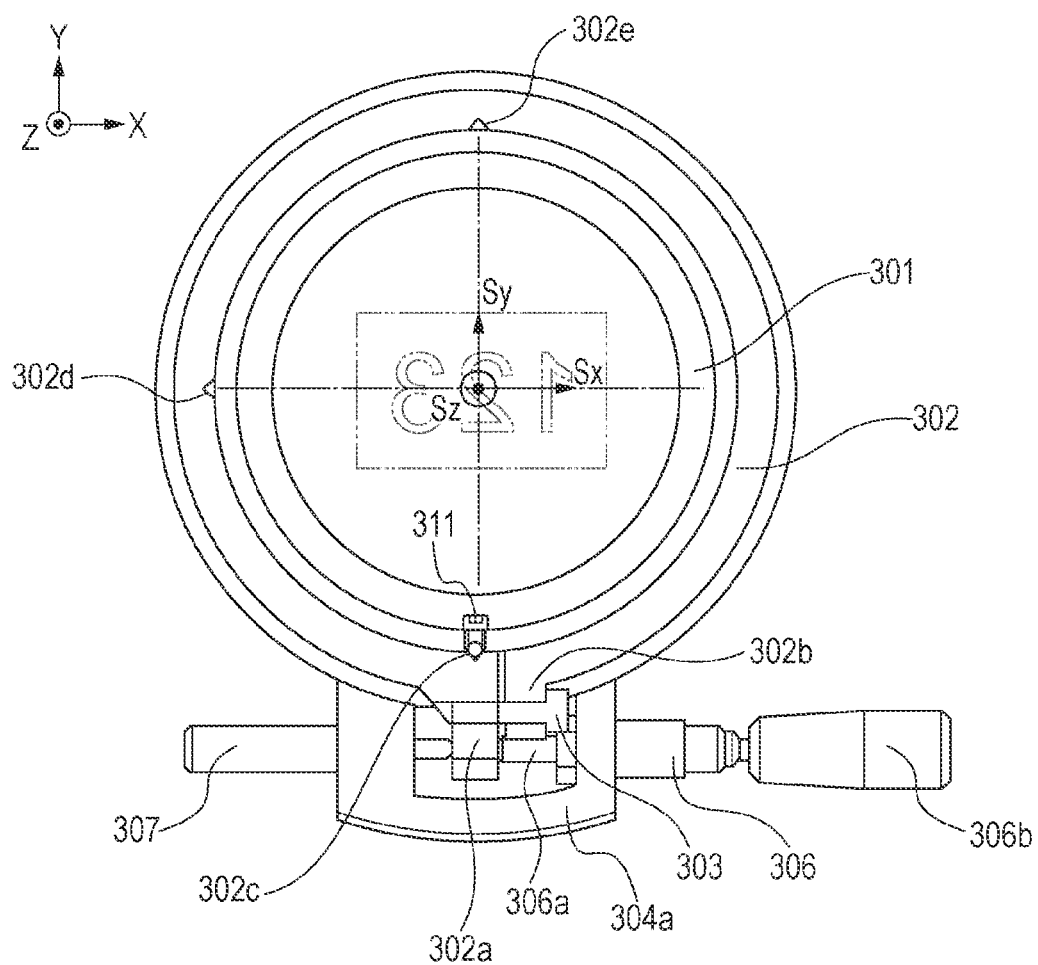

FIG. 3A is a perspective view of the adapter 300 according to the first embodiment in a direction different from that of FIG. 2A. FIG. 3B is a cross-sectional view taken along a line IIIB to IIIB of FIG. 3A. A pressure member 311 is a ball plunger including a ball, a compression spring, and a housing. The housing including a male screw formed on an outer circumference thereof is supported by the camera mount 301 including a female screw formed thereon. The compression spring presses the positioning reference member 302 through the ball. A groove 302d of a V-shape is formed on an X axis which is parallel to an Sx axis of the image sensor 401 and which has a point on an optical axis of the lens base 121 as an origin in an inside diameter of the positioning reference member 302. Furthermore, grooves 302c and 302e of a V-shape are formed on a Y axis which is parallel to an Sy axis of the image sensor 401 and which has a point on the optical axis of the lens base 121 as an origin in the inside diameter of the positioning reference member 302. Specifically, the grooves of the V-shape are formed in a 90-degree pitch interval. The ball of the pressure member 311 is engaged with the V-shape grooves in positions of the 90-degree pitch so that a position of the camera mount 301 is determined. The pressure member 311 is an example of a guide member.

In a case where the digital still camera 400 is rotated relative to the microscope 100, the fastening force of the bolt 303 is released so that the positioning reference member 302 is unfixed relative to the camera mount 301. When the camera mount 301 is rotated relative to the positioning reference member 302, the camera mount 301 is guided to a predetermined position by the guide member disposed every 90 degrees. In the predetermined position, the ball is dropped in the V-shaped groove. Here, a user who performs an operation of rotating the digital still camera 400 has a feeling of clicking. The bolt 303 is fastened again in the desired guide position so that the positioning reference member 302 and the camera mount 301 are fixed. By this, the rotation of the digital still camera 400 attached to the camera mount 301 may be changed to 90 degrees or 180 degrees.

Figure 4A:
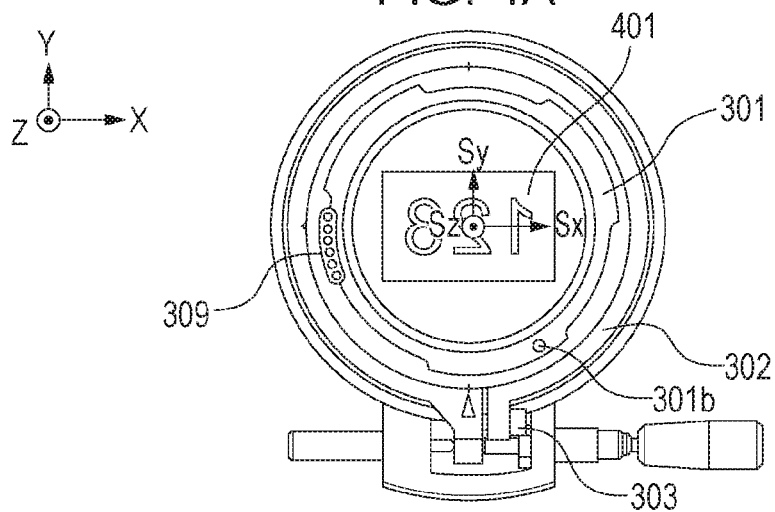
FIGS. 4A to 4C are diagrams illustrating an example of rotation of the adapter according to the first embodiment.
Figure 4B:
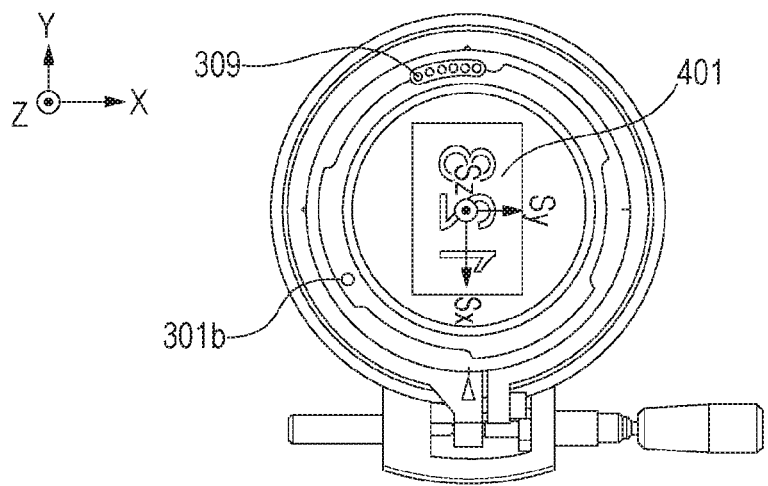
Figure 4C:
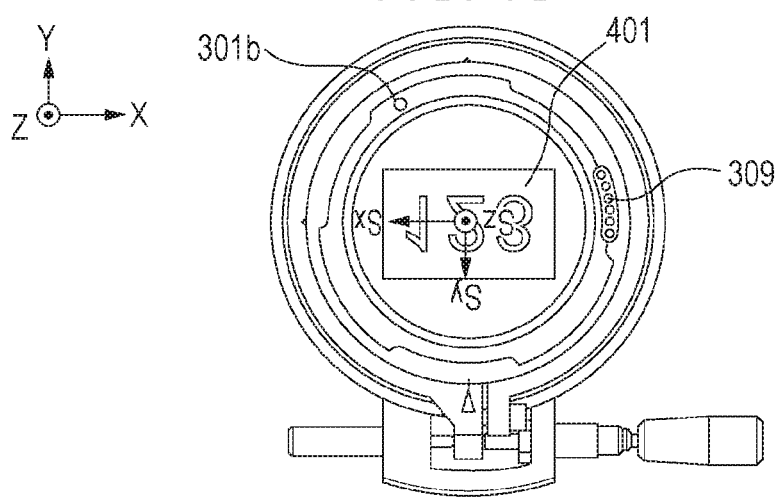

FIGS. 4A to 4C are diagrams illustrating an example of rotation of the image sensor 401 disposed on the digital still camera 400 relative to the stage 200. X, Y, and Z axes match X, Y, and Z axes of the stage 200, the slide 700, the microscope 100, and the adapter 300. It is assumed that the X, Y, Z axes of the stage 200, the slide 700, the microscope 100, and the adapter 300 match one another in advance. Note that Sx, Sy, and Sz axes indicate directions of three axes of arrangement of pixels in the image sensor 401.

FIG. 4A is a diagram illustrating an example of rotation of the camera mount 301 and the positioning reference member 302, and the Sx and Sy axes of the image sensor 401 match the X and Y axes of the stage 200. FIG. 4B is a diagram illustrating a state in which the camera mount 301 is rotated by 90 degrees relative to the positioning reference member 302. In FIG. 4B, the Sx axis of the image sensor 401 matches the Y axis of the stage 200, and the Sy axis of the image sensor 401 matches the X axis of the stage 200. FIG. 4C is a diagram illustrating a state in which the camera mount 301 is rotated by 180 degrees relative to the positioning reference member 302. In FIG. 4C, the Sx axis of the image sensor 401 matches the X axis of the stage 200, and the Sy axis of the image sensor 401 matches the Y axis of the stage 200. As illustrated in the states of FIGS. 4A to 4C, rotation of the digital still camera 400 relative to the microscope 100 may be changed by changing rotation of the camera mount 301 relative to the positioning reference member 302.

As described above, the microscope adjustment method for changing the rotation of the camera mount 301 and the positioning reference member 302 includes the following procedure from (1) to (5). (1) The camera mount 301 is unfixed relative to the positioning reference member 302 by releasing the bolt 303 which has been fastened on the positioning reference member 302. (2) The camera mount 301 is rotated relative to the positioning reference member 302. (3) Clicking engagement is made in a position of rotation by 90 degrees or 180 degrees. (4) The camera mount 301 is fixed on the positioning reference member 302 by fastening the bolt 303 which has been in a released state. The camera mount 301 and the positioning reference member 302 are coupled and fixed with high rigidity by fixing the camera mount 301 and the positioning reference member 302 by the bolt 303.

In this way, the camera mount 301 and the positioning reference member 302 may be rotated by 180 degrees at maximum in the unfixed state.

Furthermore, if fine feeding adjustment is mistakenly performed by the driving member in the operation of the microscope in the state in which the bolt 303 is unfixed, only the positioning reference member 302 is rotated and the camera mount 301 is not rotated. When the driving member employs an electric driving method, an abnormal state in which an image to be rotated in accordance with a fine feeding amount is not rotated may be detected. Such an abnormality detection may be displayed in the display 502 as a "rotation error" by the live-view function for an output image of the image sensor 401 under control of the controller 501.

(5) In the fixed states of FIGS. 4A to 4C, although the Sx axis and the Sy axis of the image sensor 401 substantially match the X axis and the Y axis of the microscope, a positional error of approximately 100 μm may be included. Therefore, rotation around the optical axis of the image sensor 401 is corrected by the micrometer head 306. Note that, although clicking portions are disposed at a 90-degree pitch as illustrated in FIGS. 4A to 4C in the first embodiment, a plurality of clicking portions may be disposed at another angle pitch.

Figure 5:
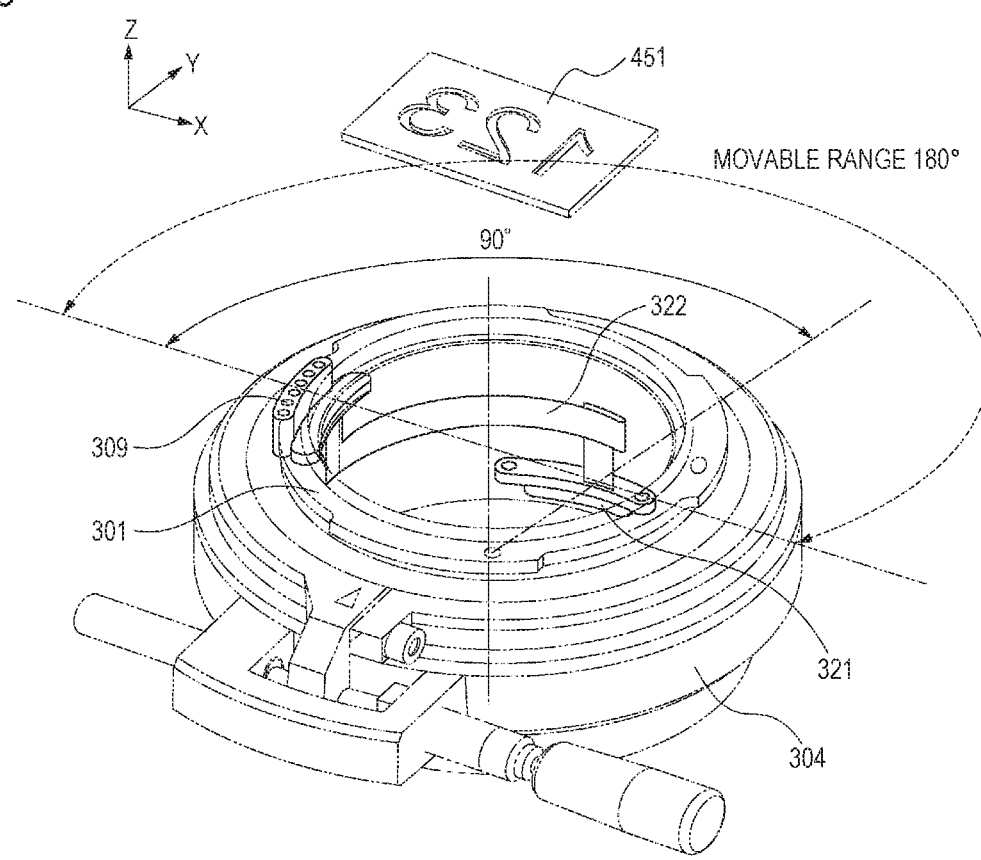
FIG. 5 is a diagram illustrating an example of communication terminals of the adapter according to the first embodiment.

FIG. 5 is a diagram illustrating an example of communication terminals which perform electric communication between the digital still camera 400 and the microscope 100. A camera mount communication terminal 309 supported by the camera mount 301 and a microscope mount communication terminal 321 supported by the microscope mount 304 are connected to each other through a flexible cable 322 so as to perform electric communication with each other. The microscope mount communication terminal 321 is an example of a first connection terminal included in the microscope mount 304. Furthermore, the camera mount communication terminal 309 is an example of a second connection terminal included in the camera mount 301. The flexible cable 322 has a thin flexible film form, for example. The flexible cable 322 partially has a U-shape portion so as to flexibly follow a change of a distance between the communication terminals caused by rotation of the camera mount 301 and the microscope mount 304. The camera mount communication terminal 309 has a movable range of 180 degrees relative to the microscope mount communication terminal 321.

The microscope mount communication terminal 321 is disposed in a center position of the movable range of 180 degrees. In an XY plane in FIG. 5, the camera mount communication terminal 309 and the microscope mount communication terminal 321 overlap with each other in a position in which the camera mount 301 and the positioning reference member 302 are rotated by 90 degrees. Specifically, a distances between the microscope mount communication terminal 321 and the camera mount communication terminal 309 relative to the optical axes of the digital still camera 400 and the lens base 121 becomes minimum at the center of the rotation movable range.

As a modification example of the first embodiment, the camera mount 301 may be supported by the outer ring of the bearing 310 and the microscope mount 304 may be supported by the inner ring of the bearing 310. Furthermore, the positioning reference member 302 may be disposed on the microscope mount 304 and the micrometer head 306 may be supported by the camera mount 301. Moreover, the positioning reference member 302 may be fixed on the camera mount 301, and a fixed state in which the microscope mount 304 is fixed on the bearing 310 and an unfixed state in which the microscope mount 304 is freely rotatable may be switched from one to another.

As described above, according to the adapter 300 of the first embodiment or the modification example, the microscope 100 and the image sensor 401 may be rotated with high accuracy. Then the adapter 300 may correct a rotation shift around the optical axes of the image sensor 401 and the lens base 121 of the microscope 100. Specifically, the adapter 300 may correct a rotation shift around the optical axes of the image sensor 401 and the stage 200. Furthermore, the digital still camera 400 may be easily rotated in a desired angle using the positioning reference member 302. Use of the adapter 300 enables use of digital still cameras 400 of various standards in the microscope system 10. Even if the digital still cameras 400 of the various standards are attached to the microscope 100, the digital still cameras 400 may be rotated in a desired angle with high accuracy. Accordingly, a work flow of the microscope observation by pathologists may be improved.

Second Embodiment

According to a second embodiment, an adapter 300 changes rotation of a digital still camera 400 and a stage 200 by a mechanism different from that of the first embodiment.

Figure 6A:
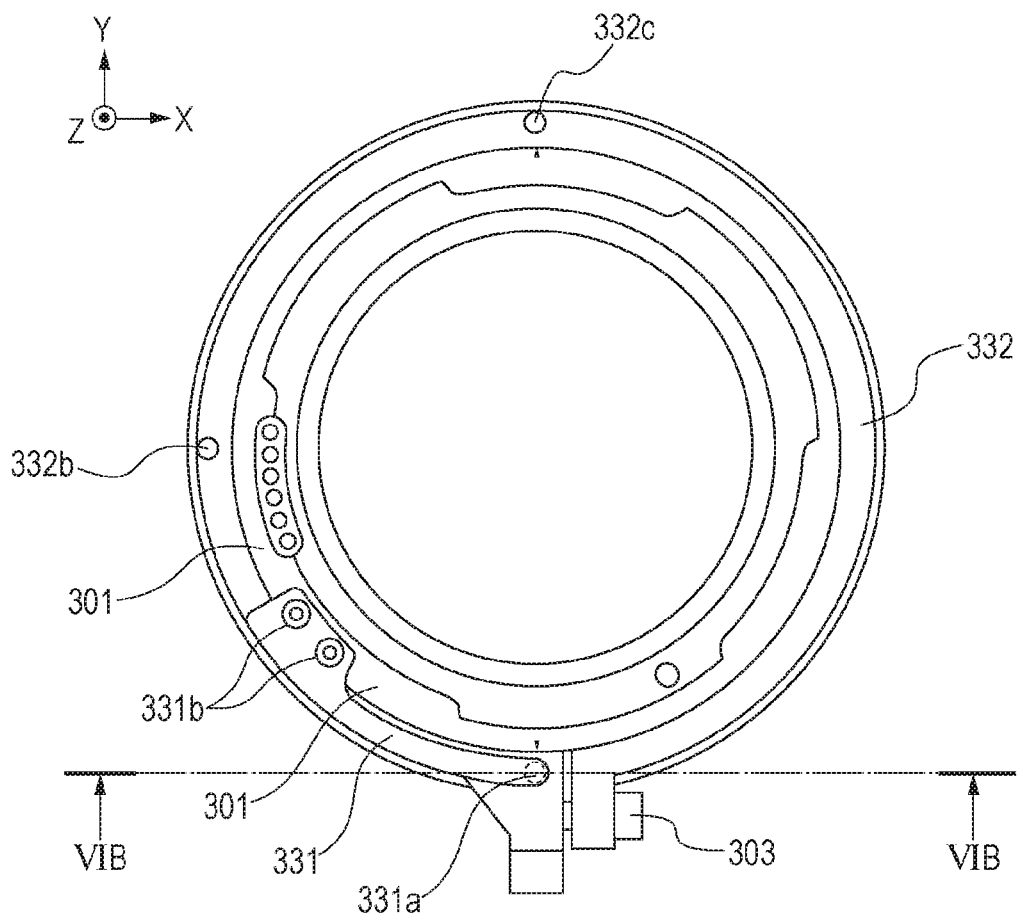
FIGS. 6A and 6B are diagrams illustrating an example of an adapter according to a second embodiment.
Figure 6B:
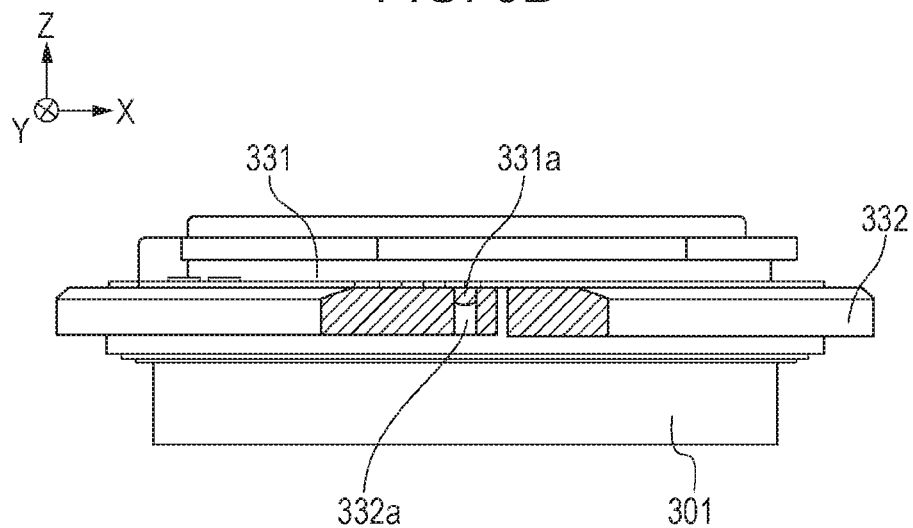

FIGS. 6A and 6B are diagrams illustrating an example of a configuration of a positioning reference member 332 of a camera mount 301 according to the second embodiment. FIG. 6A is a top view of the camera mount 301, and FIG. 6B is a cross-sectional view taken along a line VIB to VIB of FIG. 6A.

A pin 331a is disposed in a tip end of a leaf spring 331 supported by the camera mount 301. The leaf spring 331 is formed of a plate spring member of stainless or the like, and end portions 331b of the leaf spring 331 are fixed on the camera mount 301 by bolts. The pin 331a is engaged with a hole 332a of the positioning reference member 332. Backlash between the pin 331a and the positioning reference member 332 is reduced by a spring force in a Z direction of the leaf spring 331. The leaf spring 331 is an example of a guide member.

In the second embodiment, a microscope adjustment method for changing rotation of the camera mount 301 and the positioning reference member 332 includes the following procedure from (1) to (5). (1) The camera mount 301 is unfixed relative to the positioning reference member 332 by releasing the bolt 303 which has been fastened on the positioning reference member 332. (2) The leaf spring 331 is pushed up in the Z direction so that engagement between the tip end pin 331a and the hole 332a of the positioning reference member 332 is cancelled. (3) The camera mount 301 is rotated relative to the positioning reference member 332. (4) The pin 331a is engaged with a hole 332b of the positioning reference member 332 by the spring force of the leaf spring 331 in a position of 90 degrees. The pin 331a is engaged with a hole 332c of the positioning reference member 332 by the spring force of the leaf spring 331 in a position of 180 degrees. (5) The camera mount 301 is fixed on the positioning reference member 332 by fastening the bolt 303 which has been in a released state.

Third Embodiment

Figure 7A:
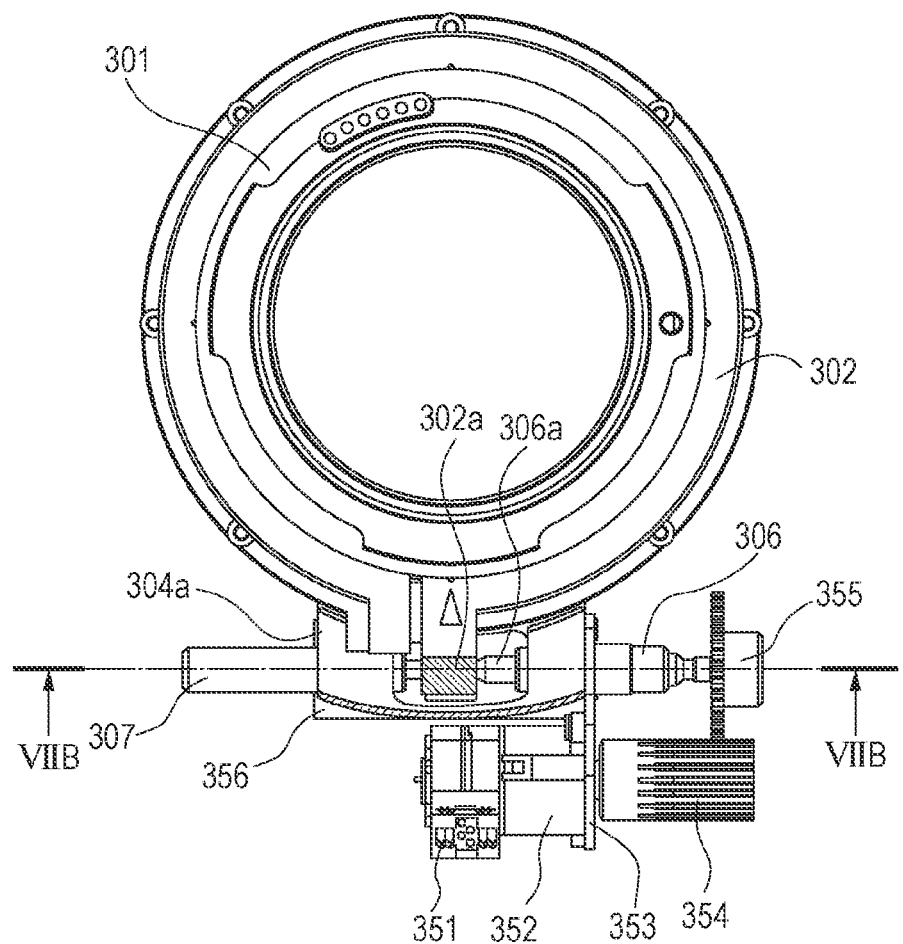
FIGS. 7A and 7B are diagrams illustrating an example of an adapter according to a third embodiment.
Figure 7B:
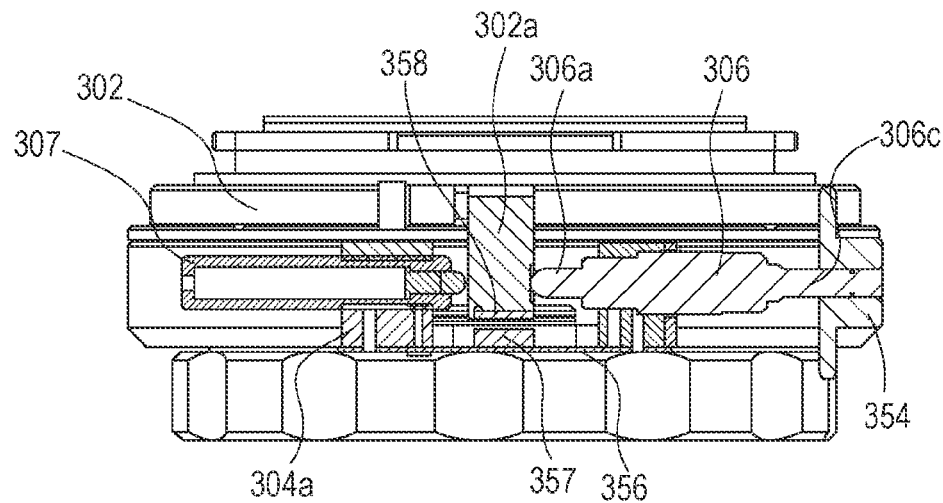

FIGS. 7A and 7B are diagrams illustrating an example of a configuration of a positioning reference member 302 of a camera mount 301 according to a third embodiment. FIG. 7A is a top view of the camera mount 301, and FIG. 7B is a cross-sectional view taken along a line VIIB to VIIB of FIG. 7A.

A unit including a motor 351 serving as a driving source which electrically drives the positioning reference member 302 and a deceleration mechanism 352 is attached to a structure 304a of a microscope mount 304 through an attachment plate 353. A gear 354 is attached to a shaft of the deceleration mechanism 352, and is engaged with a gear 355 disposed on a micrometer head 306. The gear 354 is an example of a transmission member which transmits driving force to the micrometer head 306.

A sensor substrate 356 is attached to the structure 304a and a position sensor 357 of an encoder which detects a position is implemented on the substrate. A scale 358 of the encoder is disposed on a lower portion of a first end portion 302a of the positioning reference member 302 so as to face the position sensor 357. The encoder is an example of a position detection member which detects a position of the second connection member in a rotation direction relative to the first connection member.

Figure 8A:
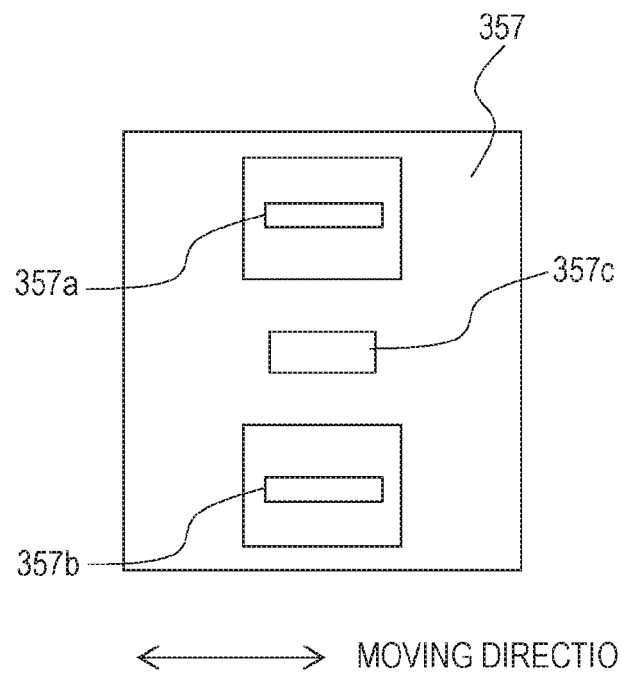
FIGS. 8A and 8B are diagrams illustrating an example of an encoder of the adapter according to the third embodiment in detail.
Figure 8B:
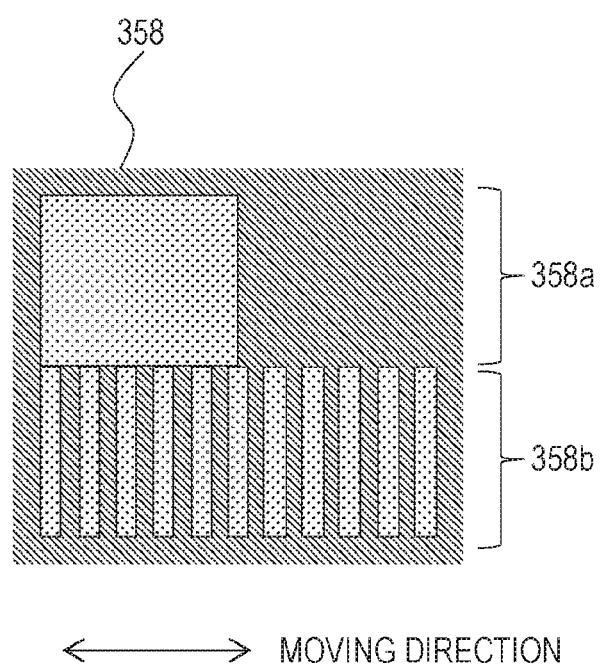

The encoder (the optical encoder) will be described in detail with reference to FIGS. 8A and 8B. FIG. 8A is a diagram illustrating the position sensor 357, and FIG. 8B is a diagram illustrating the scale 358. The position sensor 357 includes a light emission unit 357c at a center thereof. The position sensor 357 further includes light reception units 357a and 357b which sandwich the light emission unit 357c. With this configuration, two patterns of the scale (reflection scale) 358 may be read by the single position sensor 357. The scale 358 includes a zone track 358a for detection of an origin and an incremental track 358b to be used for position detection which are detected by the corresponding light reception units (light reception/emission elements) 357a and 357b while the scale 358 is moved in a moving direction denoted by arrow marks. The scale 358 is disposed in a position in which a boundary between the tracks is positioned on the light emission unit 357c.

In this embodiment, a deceleration rate from the motor 351 to the micrometer head 306 is $1/200$ and the motor 351 is rotated by $1/20$ by one driving pulse of the motor 351 serving as a stepping motor, and therefore, the micrometer head 306 is rotated by $1/4000$. The micrometer head 306 has a pitch of 500 μm, and therefore, moves straight by 0.125 μm. By this, the positioning reference member 302 is rotated by approximately $1.5 \times 10^{-4}$ degrees. Specifically, the reflection scale 358 is disposed on a control member disposed on a movable one of the first and second connection members, and the light reception/emission element is disposed on a fixed one of the first and second connection members.

Although the scale 358 is rotated, a linear type encoder may be used since a radius of rotation is large, and the tracks in the scale 358 may be configured so as to orthogonal to each other. Furthermore, if the correspondence between a signal pulse of the encoder and a rotation angle is appropriate, a relative angle detection between a microscope and an imaging element is detected from an image obtained by a camera, and therefore, rotation adjustment may be performed if the required number of driving pulses of the motor is obtained before the motor is driven.

Figure 9:
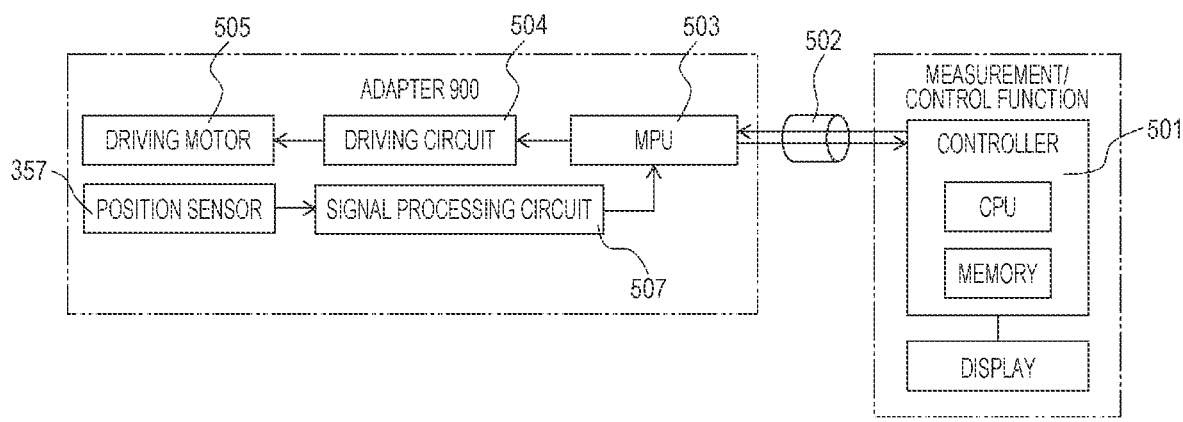
FIG. 9 is a diagram illustrating an example of a control configuration of the adapter according to the third embodiment.

FIG. 9 is a diagram illustrating an example of a control configuration of an adapter 900. The adapter 900 is connected to a controller 501 through an interface cable 502, such as a USB cable. In the adapter 900, an MPU 503 performs rotation control and the like of a positioning reference member 302 of the adapter 900 in accordance with an instruction issued by the controller 501. A driving circuit 504 drives a driving motor 505 in accordance with an instruction issued by the MPU 503. A signal supplied from a position sensor 357 is supplied to the MPU 503 through a signal processing circuit 507 and is used to restore the positioning reference member 302 of the camera mount 301 to an initial position (an original position of rotation), for example. A relative angle between the microscope and the imaging unit is calculated from an image obtained by a camera 400 in the initial position and a driving motor is rotated by a desired angle in accordance with a signal supplied from an incremental track of the position sensor 357. In this way, the positioning reference member 302 may be rotated so that an inclination of the camera 400, that is, the imaging unit, and an inclination of the microscope match each other. Note that the electric circuit components including the driving circuit 504, the MPU 503, and a power source circuit (not illustrated) consume comparatively large electric power, and therefore, the electric circuit components serve as heat sources. Accordingly, an adverse effect to positional accuracy caused by thermal expansion of the heat sources is a concern. Accordingly, these electric components may be accommodated in another housing as an external controller.

Furthermore, a function of the MPU 503 may be realized by the controller 501.

In the third embodiment, the first end portion 302a has a unit which fixes the positioning reference member 302 to the camera mount 301 and a unit for performing adjustment with high accuracy by the position sensor 357 by driving the micrometer head 306 using the motor 351. As a microscope adjustment method, a direction of the digital still camera 400 relative to the microscope 100 is determined by changing a relative position in a state in which the positioning reference member 302 is not fixed on the camera mount 301. Subsequently, the digital still camera 400 is attached to the microscope, a moving image or a still image of a subject serving as a reference of an XY axis of the stage 200 is obtained, and a relative inclination between the stage 200 and the digital still camera 400, that is, the image sensor 401, is obtained by image processing. A driving pulse corresponding to the inclinations is supplied to the motor 505, the micrometer head 306 is driven, and the positioning reference member 302 is rotated by a determined angle by the position sensor 357. An image is obtained by the digital still camera 400 again and adjustment is performed so that the relative inclination becomes zero. By performing such rough adjustment and fine adjustment, the X and Y axes of the microscope 100 and the digital still camera 400, that is, X and Y axes of the stage 200 and the image sensor 401 may be adjusted so as to match each other with extremely high accuracy.

Modifications

Note that the present disclosure may be realized by a process of supplying a program which realizes at least one of the functions described in the foregoing embodiments to a system or an apparatus through a network or a storage medium and reading and executing the program using at least one processor included in a computer of the system or the apparatus. Furthermore, the present disclosure may be realized by a circuit which realizes at least one function (an ASIC, for example).

The present invention is not limited to the foregoing embodiments, and various changes and various modifications may be made without departing from the spirit and the scope of the present invention. Accordingly, the following claims are attached to disclose the scope of the present invention.

Accordingly, an imaging unit used for observation may be rotated relative to a microscope on which a slide is placed with an optical axis at a center and the rotation may be controlled. Therefore, correction of a rotation shift may be easily performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An adapter, comprising:
a first connection member configured to be connected to a microscope;
a second connection member configured to be connected to an imaging unit;
a rotation member, disposed between the first connection member and the second connection member and including a first securing portion secured to the first connection member and a second securing portion secured to the second connection member and rotatable with respect to the first securing portion and configured to facilitate rotation of the second connection member with respect to the first connection member about a center axis, the center axis extending through optical centers of the microscope and the imaging unit in a state where the adapter is connected to the microscope and the imaging unit;
a control member configured to control a rotatable state between the first connection member and the second connection member in any one of a fixed state and a unfixed state of any one of the first connection member and the second connection member with respect to the other;
a driving member configured to engage with the control member in the fixed state and rotate the second connection member relative to the first connection member around the center axis; and
a guide member configured to guide the rotation of the one of the first connection member and the second connection member in a case where the control member is in the unfixed state and include a plurality of clicking portions which guide an angle of rotation of the one of the first connection member and the second connection member relative to the other, the plurality of clicking portions including a groove portion of a V shape, a ball positioned in the groove portion and a spring.

2. An adapter, comprising:
a first connection member configured to be connected to a microscope;
a second connection member configured to be connected to an imaging unit, the first connection member and the second connection member have a first communication terminal and a second communication terminal which are connected to each other and an angular distance between the first and second communication terminals becomes minimum in a center of a first rotation variable range;
a rotation member disposed between the first connection member and the second connection member and including a first securing portion secured to the first connection member and a second securing portion secured to the second connection member and rotatable with respect to the first securing portion and configured to facilitate rotation of the second connection member with respect to the first connection member about a center axis, the center axis extending through optical centers of the microscope and the imaging unit in a state where the adapter is connected to the microscope and the imaging unit;
a control member configured to control a rotatable state between the first connection member and the second connection member in any one of a fixed state and a unfixed state of any one of the first connection member and the second connection member with respect to the other; and
a driving member configured to engage with the control member in the fixed state and rotate the second connection member relative to the first connection member around the center axis;
wherein a first rotation variable range for a position of the second connection member relative to the first connection member in the unfixed state of the control member is larger than a second rotation variable range for the fixed state of the control member,
wherein the first rotation variable range is divided into predetermined angles.

3. A microscope system, comprising: an adapter according to claim 2;
the microscope configured to be connected to any one of the first connection member and the second connection member, and
the imaging unit configured to be connected to the other of the first connection member and the second connection member.

4. The adapter according to claim 2, further comprising:
a position detection member configured to detect a position of the second connection member in a rotation direction relative to the first connection member.

5. The adapter, according to claim 4,
wherein the position detection member is an optical encoder including a light reception/emission element and a reflection scale,
wherein the reflection scale is disposed on the control member disposed on the second connection member which is movable, and
wherein the light reception/emission element is disposed on the first connection member which is fixed.

6. The adapter, according to claim 4, wherein a driving source is driven by an output of the position detection member so that a rotation angle of the second connection member relative to the first connection member is adjusted.

7. The microscope system, comprising: an adapter according to claim 4, and a driving source configured to drive the driving member through a transmission member.

8. The adapter according to claim 2, further comprising:
a driving source configured to drive the driving member through a transmission member.

9. The adapter, according to claim 2, wherein the rotation member is concentric with the first connection member and the second connection member.

10. The adapter, according to claim 9, wherein the second connection member rotates within a plane perpendicular to the center axis.

11. An adapter, comprising:
a first connection member configured to be connected to a microscope;
a second connection member configured to be connected to an imaging unit:
a rotation member disposed between the first connection member and the second connection member and including a first securing portion secured to the first connection member and a second securing portion secured to the second connection member and rotatable with respect to the first securing portion and configured to facilitate rotation of the second connection member with respect to the first connection member about a center axis, the center axis extending through optical centers of the microscope and the imaging unit in a state where the adapter is connected to the microscope and the imaging unit;
a control member configured to control a rotatable state between the first connection member and the second connection member in any one of a fixed state and a unfixed state of any one of the first connection member and the second connection member with respect to the other; and
a driving member configured to engage with the control member in the fixed state and rotate the second connection member relative to the first connection member around the center axis,
wherein a first rotation variable range for a position of the second connection member relative to the first connection member in the unfixed state of the control member is larger than a second rotation variable range for the fixed state of the control member, the first rotation variable range is divided into predetermined angles in increments of 90 degrees.

12. An adapter, comprising:
a first connection member configured to be connected to a microscope;
a second connection member configured to be connected to an imaging unit:
a rotation member disposed between the first connection member and the second connection member and including a first securing portion secured to the first connection member and a second securing portion secured to the second connection member and rotatable with respect to the first securing portion and configured to facilitate rotation of the second connection member with respect to the first connection member about a center axis, the center axis extending through optical centers of the microscope and the imaging unit in a state where the adapter is connected to the microscope and the imaging unit;
a control member configured to control a rotatable state between the first connection member and the second connection member in any one of a fixed state and a unfixed state of any one of the first connection member and the second connection member with respect to the other; and a driving member configured to engage with the control member in the fixed state and rotate the second connection member relative to the first connection member around the center axis, wherein a first rotation variable range for a position of the second connection member relative to the first connection member in the unfixed state of the control member is larger than a second rotation variable range for the fixed state of the control member, the first rotation variable range is divided into predetermined angles in increments of 30 degrees.

* * * * *